(12) United States Patent
Davar et al.

(10) Patent No.: US 10,049,372 B2
(45) Date of Patent: Aug. 14, 2018

(54) SEARCH AND RANK ORGANIZATIONS

(71) Applicant: 0934781 B.C. Ltd, Vancouver (CA)

(72) Inventors: Ali Davar, Vancouver (CA); Simon James Hewitt, Vancouver (CA); Maziyar Hamdi, Vancouver (CA)

(73) Assignee: 0934781 B.C. Ltd, Vancouver (CA)

( * ) Notice: Subject to any disclaimer, the term of this patent is extended or adjusted under 35 U.S.C. 154(b) by 574 days.

(21) Appl. No.: 14/682,381

(22) Filed: Apr. 9, 2015

(65) Prior Publication Data

US 2016/0132902 A1  May 12, 2016

Related U.S. Application Data

(63) Continuation-in-part of application No. 14/537,092, filed on Nov. 10, 2014, now Pat. No. 9,773,272.

(60) Provisional application No. 62/082,088, filed on Nov. 19, 2014, provisional application No. 62/082,076, filed on Nov. 19, 2014, provisional application No. 62/126,372, filed on Feb. 27, 2015.

(51) Int. Cl.
*G06Q 30/02* (2012.01)
*G06F 17/30* (2006.01)

(52) U.S. Cl.
CPC ..... *G06Q 30/0201* (2013.01); *G06F 17/3053* (2013.01); *G06F 17/30312* (2013.01); *G06F 17/30424* (2013.01); *G06F 17/30554* (2013.01)

(58) Field of Classification Search
CPC ..................................................... G06Q 30/06
USPC ....................................................... 705/26.1
See application file for complete search history.

(56) References Cited

U.S. PATENT DOCUMENTS

| | | | | |
|---|---|---|---|---|
| 2008/0235216 | A1* | 9/2008 | Ruttenberg | G06F 17/30867 |
| 2014/0280224 | A1* | 9/2014 | Feinberg | G06F 17/30958 |
| | | | | 707/748 |
| 2015/0106244 | A1* | 4/2015 | Lo Faro | G06Q 40/12 |
| | | | | 705/30 |
| 2015/0149286 | A1* | 5/2015 | Brown, II | G06Q 30/0264 |
| | | | | 705/14.58 |
| 2017/0316439 | A1* | 11/2017 | Murray | G06F 17/30604 |

* cited by examiner

*Primary Examiner* — Mila Airapetian

(57) ABSTRACT

A computer method and system provide means for outputting data about organizations to a user. The system includes a database of business relationships between organizations. A user may search for first organizations according to search criteria. The method will select a set of first organizations that match the criteria. The user may select preferred values of second organizations connected to the first organizations. Using the preferred values, the method will reselect and rank the first organizations for display on the user's computing device.

19 Claims, 9 Drawing Sheets

SEARCH AND RANK ORGANIZATIONS

RELATED APPLICATIONS

This application claims the benefit of: U.S. patent application Ser. No. 14/537,092 filed Nov. 10, 2014, entitled "Recommendation Engine"; U.S. Patent Provisional Application Nos. 62/082,088 and 62/082,076, both filed on Nov. 19, 2014, both entitled "Business Relationship Accessing"; and Patent Provisional Application No U.S. 62/126,372, filed Feb. 27, 2015, entitled "Product or Service Recommendation". The contents and disclosure of the above are incorporated herein by reference in their entirety.

TECHNICAL FIELD

The present disclosure relates to methods for operating a system and database of business relationships between organizations. Certain methods are useful for selecting, processing and ranking organization according to search parameters selected by a user. The system may comprise a computer network accessible via the Internet.

BACKGROUND

People commonly use a search engine to find companies and evaluate the quality or appropriateness of the companies from reviews. For example, Google and Bing provide general Internet search services, whilst TrustRadius, G2Crowd, and Findthecompany.com provide a service specifically for searching for a company or software. The list of companies may be reduced or focused by the user selecting one or more filters of the company attributes.

The effect of applying a filter is to include satisfying companies and remove non-satisfying companies from the displayed list. The score or rank of the extant companies is not affected by the filter selections. The companies are typically ranked by their own attributes such as revenue, employees, and location or by user ratings.

As a consequence, the effect of applying filters is to reduce the number of companies displayed to the user with the order of the display unchanged.

The inventors have appreciated an advantage of using the filter selection in the ranking algorithm to better reflect the user's query. The present inventors have appreciated an opportunity to address these issues by creating a database of business relationships.

BRIEF SUMMARY OF THE INVENTION

The inventors have envisaged a database, network, system, and methods for operating with data about business relationships. The strength of an organization's score at least partly depends on the attributes of other organizations connected to that organization. The ranking provides a basis for making a recommendation of organizations, products and services.

According to a first aspect of the inventions there is provided a computer-implemented method of communication data about organizations to a user from a database storing business relationships between organizations. The method comprises:
a processor receiving at a server, a query from a client device to output a set of first organizations, wherein the query comprises a criteria for selecting first organizations and one or more user-selected attributes for selecting second organizations;
a processor selecting a set of first organizations that satisfy the criteria and selecting a set of second organizations that have attributes that match the one or more user-selected attributes and that have a business relationship with any selected first organization;
a processor ranking the first organizations, wherein a rank of each first organization depends on a relevance of (a) attributes of second organizations having a business relation with that first organization to (b) the user-selected attributes; and a processor communicating to the user, a subset of the first organizations, according to the ranking.

According to a second aspect of the inventions there is provided a computer-implemented method of communication data about vendors to a user from a database storing business relationships between organizations. The method comprises:
a processor receiving search criteria from a user;
a processor identifying, from the database, vendors that satisfy the search criteria and clients supplied by the identified vendors;
a processor providing a user-interface comprising a plurality of interactive elements for selecting attribute values of the clients;
a processor receiving the user's selection of attribute values of the clients; using the user's selections to rank vendors; and
communicating to the user identity data of some of the ranked vendors.

According to a third aspect of the inventions there is provided a computer-implemented method of communication data about vendors to a user from a database storing business relationships between organizations. The method comprises:
a processor receiving at a server, a query from a client device to output data corresponding to a set of vendors, wherein the query comprises a criteria for selecting vendor data objects, and one or more user-selected attribute values for selecting client data objects;
a processor selecting vendor data objects comprising data that satisfy the criteria;
a processor selecting client data objects that comprise attribute values satisfying the one or more user-selected attributes and that are connected by a business relationship data object with any selected vendor data object;
a processor ranking the vendor data objects, wherein a rank for each vendor data object depends on the relevance of (a) attributes of client data objects connected by a business relation data object to that vendor data object to (b) the user-selected attribute values; and
a processor communicating content to a user relating to the highest ranked vendors data objects.

Preferably only first organizations that have a business relationship with second organizations are communicated to the user.

The first organizations may be suppliers of a product or service relevant to the criteria and the second organizations may be consumers of those products or services.

The rank of each first organization may be at least partly based on a relevance score of attribute values of that first organization to the criteria.

The criteria for selecting first organizations may be directed to a business function, product or service.

Each selected second organization may have attribute values that match the user-selected attributes for all of a plurality of attribute types.

Each selected second organization may have attribute values that match any of the user-selected attributes.

The criteria may comprise keyword(s) entered by the user, which keyword(s) specify an industry, specialization, service or product of first organizations to be selected.

The rank of each first organization may be at least partly based on a relevance of (i) products or services supplied by that first organization to one or more second organizations to (ii) the criteria.

The user-selected attributes may be determined from attribute filter values selected or deselected by the user from a plurality of attribute types.

The one or more user-selected attributes may be directed to one or more of: location, industry, size, or revenue.

The one or more user-selected attributes may be directed to relationship attributes of the business relationship between the first and second organizations, the relationship attributes preferably being one or more of: a rating, a duration, or a monetary spending.

A method may further comprise a processor altering a ranking function for first organizations if the one or more user-selected attributes differ from default attribute selections.

Ranking may comprise a utility function applied to attributes of the second organizations, whereby the utility function's output is maximum within a range determined by the user-selected attributes and decays to a minimum outside of the range.

At least one of the user-selected attribute values may be relationship attributes of relationship data objects and selecting client data objects may further comprise selecting client data objects that are connected to any selected vendor data object by a relationship data object satisfying the user-selected relationship attribute, preferably wherein the relationship attribute is an anonymity status or verification status.

The relationship data object may indicate the supply of products or services from a vendor to a client.

A method may further comprise a processor using the user's selections to select for display only vendors that supply clients that satisfy the user's selections.

A method may further comprise a processor aggregating attributes of the identified clients to determine a range of attribute values selectable in the interactive elements.

A method may further comprise a processor determining an initial ranking of identified vendors and outputting the ranked vendors to the user.

The initial ranking of identified vendors may depend on the attributes of the identified vendors.

The interactive elements may relate to a plurality of attribute types, each having a plurality of attribute values from which the user may select.

A method may further comprise the processor initializing selections of the filter values to a default setting, wherein changes by the user to the default settings increases a ranking weight for that filter category.

According to a fourth aspect of the inventions there is provided a computer system comprising: a database of business relationships between organizations; one or more computer processors; and computer-readable media having instructions for execution by the one or more processors to implement a method of any of the above methods.

It is therefore possible to output a set of organizations that satisfies the user search query and is ranked by the user's attribute selections.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

The invention may be illustrated by the following figures, in which like reference numerals refer to similar elements.

DETAILED DESCRIPTION

A system, network, and computer program are implemented to capture and query the relationships between organizations. This enables users as viewers to determine the relationships between organizations or search for an organization according to certain criteria. This also enables users as content creators to demonstrate their place and associations in the business community for viewers to analyze. The system may be utilized to provide personalized recommendations of organizations according to user-selected criteria, as discussed in co-pending application U.S. Ser. No. 14/537,092 "Recommendation Engine". The system may also be utilized to generate web pages from pre-defined criteria. The computer program may be conceptually divided into separate modules or agents to provide discreet functions, although in principle there may be less clear boundary in implementing these functions. Agents such as a ranking agent, input agent, and output agent provide a webpage of ranked organizations to a user, which rankings can also be affected by further selections of attributes by the user.

Figure 1:
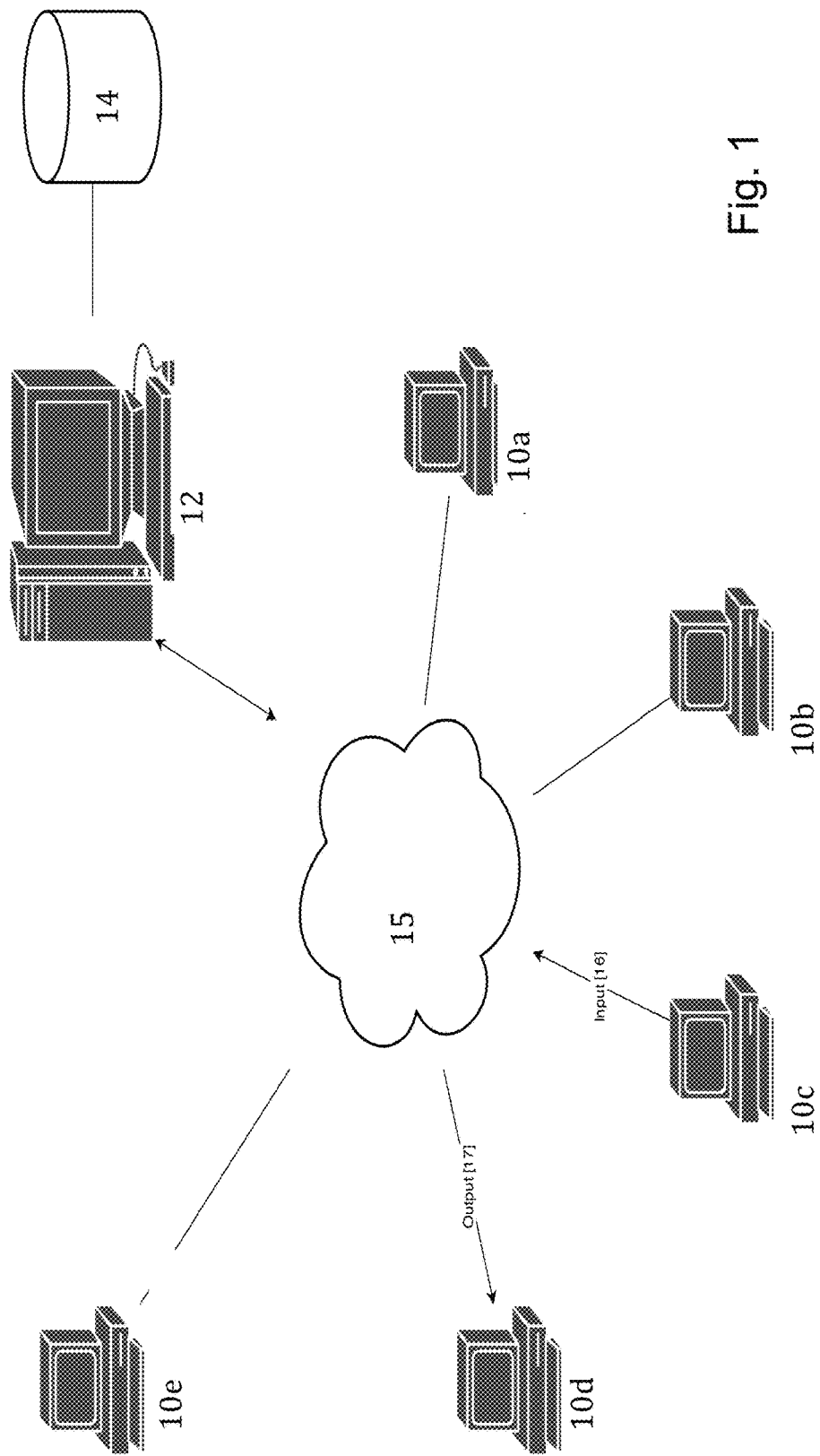
FIG. 1 illustrates a diagram of a network of computers for accessing a database of business relationships.

As shown in FIG. 1, the system may be implemented as a network 15 of interconnected computing devices 10a-e and server 12 for inputting and receiving relationship data from a database 14. The database 14 is connectable to user 10c for receiving data and user 10d for outputting data. The names of these devices are for simplicity of understanding and may be any computing device and each device may be used for a plurality of these roles.

In order to contain the huge set of global organizations, the database comprises at least one million organizations and one million relationships stored on non-transitory, computer-readable storage media. Thus it is essential that the storing, querying and computational methods be performed by one or more computers. It will be understood that operations described herein as being carried out on organizations and business relationships are actually those carried out on the data structures and database objects representing the real-world organizations and relationships.

The server 12 may comprise one or more computer processors for reading instructions from computer-readable storage media and executing the instructions to provide the methods and agents described below. Examples of computer-readable media include disc-based media such as CD-ROMs and DVDs, magnetic media such as hard drives and other forms of magnetic disk storage, semiconductor based media such as flash media, random access memory, and read-only memory.

An organization is generally used herein to refer to a legal entity providing or receiving products or services. While an organization may typically be a business, the term includes but is not limited to charities, corporations, sole proprietors, Non-Government Organizations, institutions, government departments, and partnerships. The term vendor is used herein to refer to organizations that supply products or services to a client in a business relationship, notwithstanding that they may also consume products or services in another relationship. A business relationship is generally used herein to refer to a business-to-business (B2B) relationship or ongoing commercial transactions between organizations to provide those products or services. Preferably the relationship represents an agreement, which, for example, may subsist in a contract, a terms-of-business document or an ongoing understanding. Most preferably the business relationships stored in the database represent relationships that have been ongoing for at least three months or have at least three repeat instances of transactions. This is in contrast to personal relationships, non-commercial relationships, click-thru data, user website activity data, or one-off commercial transactions. Therefore the strength of the present recommendation is derived from a deep tie between organizations, as recorded in the database. An ongoing, high-value relationship is used as a proxy to suggest that one organization is a worthy supplier of products or services.

A user is generally defined as a person who interacts with a computer, typically entering search criteria, following hyperlinks and viewing results to determine what organizations are recommended. The user is expected to be associated with a particular organization and is seeking a recommendation suited for that organization.

Figure 2:
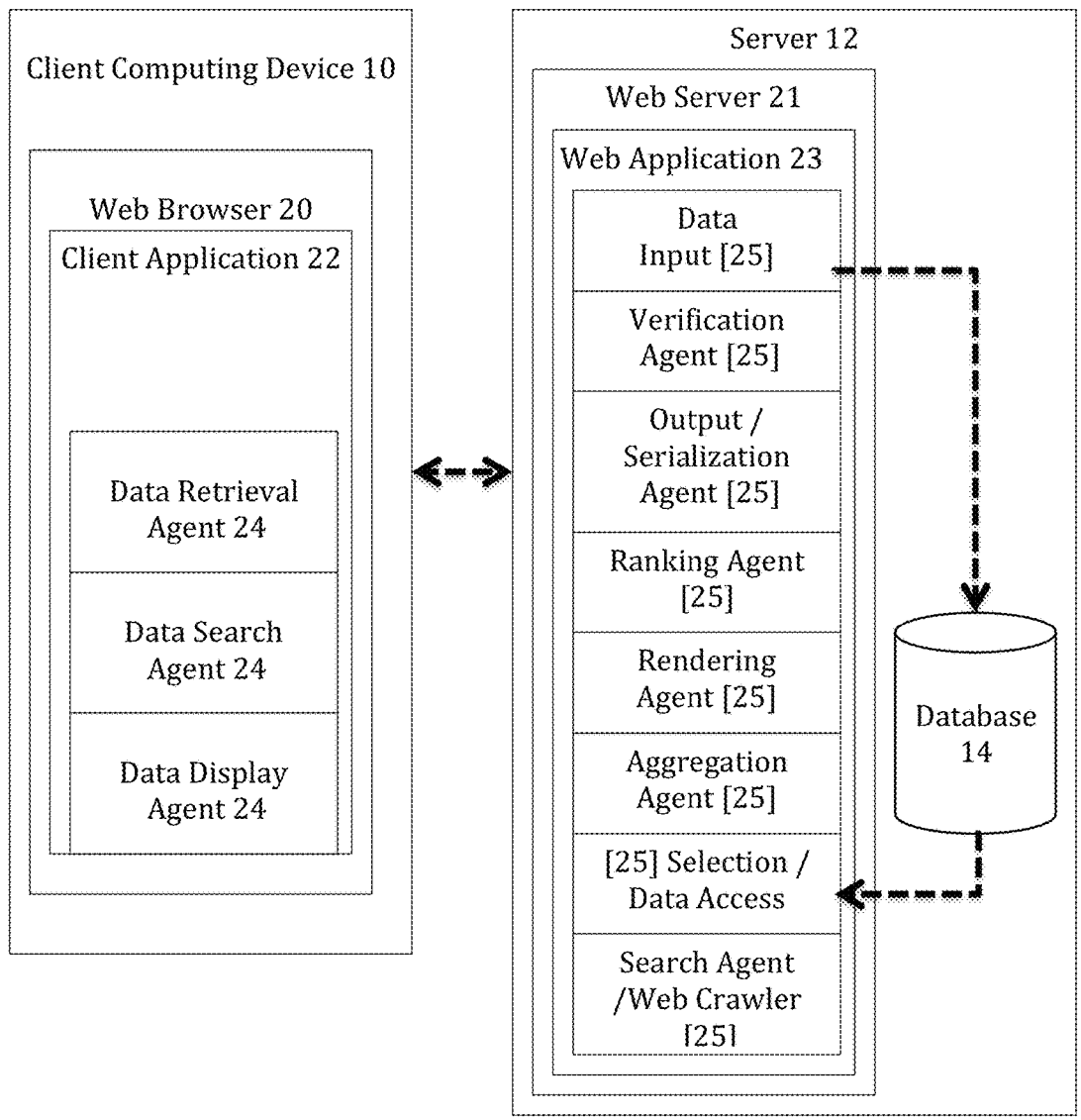
FIG. 2 is a diagram of agents for interaction between a client device and server.

FIG. 2 illustrates the interaction between a client computation device 10 and the server 12 over network 15. The device 10 may interact via a web browser 20 having an application layer 22. The application may use software agents 24 to search the database 14, retrieve output data 17 and display the data on the user's device. The server 12 may be a reverse proxy server 21 for an internal network, such that the client 10 communicates with an Nginx web server 21, which relays the client's request to associated server(s) and database(s) 14. Within the server(s) a web application 23 comprises agents 25 for operating with the database 14.

Users may access the database 14 remotely using a desktop or laptop computer, smartphone, tablet, or other computing device connectable to the server 12 by mobile internet, fixed wireless internet, WiFi, wide area network, broadband, telephone connection, cable modem, fiber optic network or other known and future communication technology.

The client device 10 may interact with the server using a web browser using conventional Internet protocols. Some or all of the methods for operating the database may reside on the server device. The client device 10 may have software loaded for running within the client operating system, which software is programmed to implement some of the methods. The software may be downloaded from a server associate with the provider of the database or from a third party server. Thus the implementation of the client device interface may take many forms known to those in the art. Alternatively the client device simply needs a web browser and the web server 12 may use the output data to create a formatted web page for display on the client device.

The methods and database discussed herein may be provided on a variety of computer system and are not inherently related to a particular computer apparatus, particular programming language, or particular database structure. In preferred embodiments the system is implemented on a server. The term 'server' as used herein refers to a system capable of storing data remotely from a user, processing data and providing access to a user across a network. The server may be a stand-alone computer, mainframe, a distributed network or part of a cloud-based server.

Figure 3:
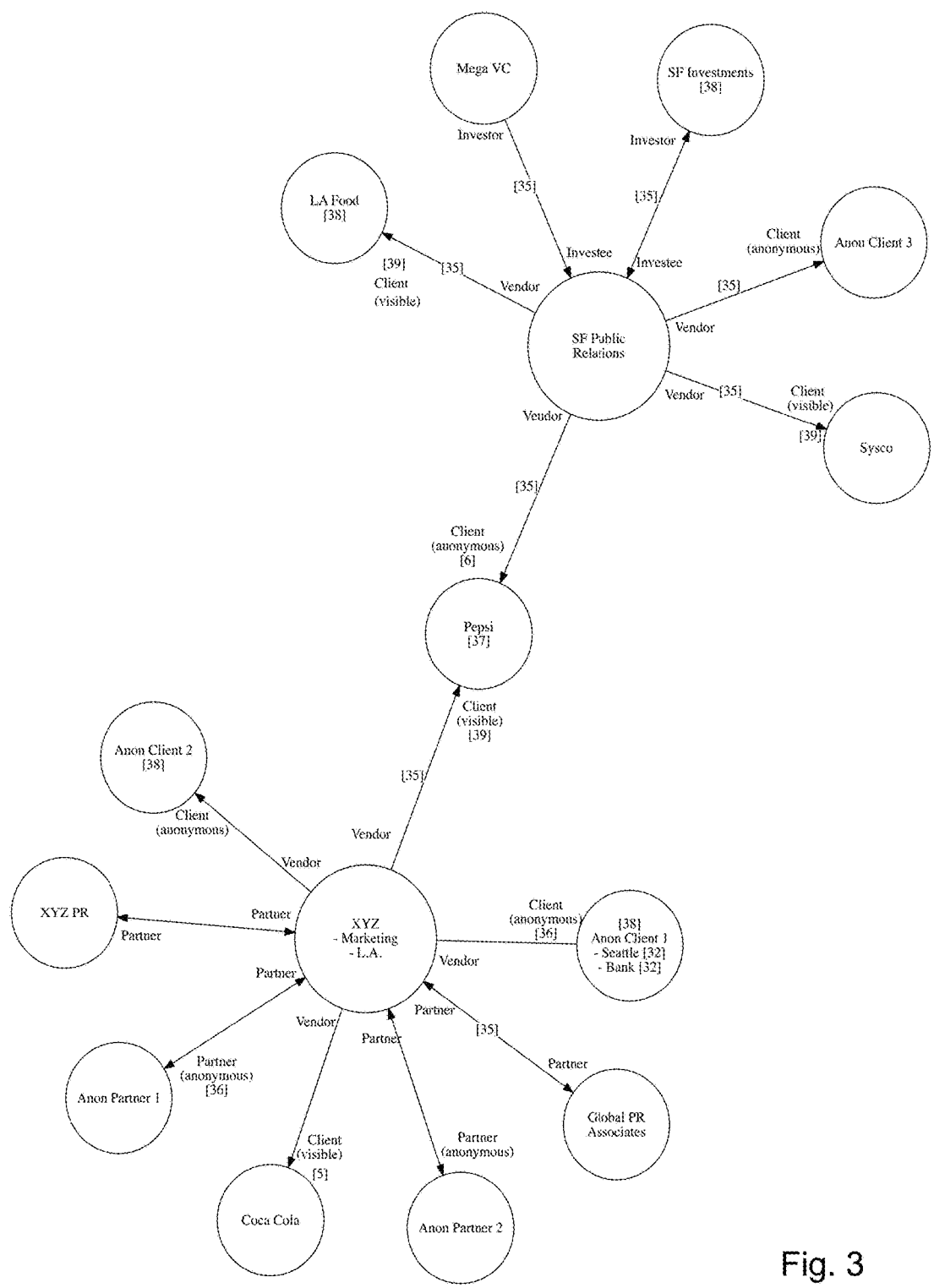
FIG. 3 is a diagram of example relationships in a database.

As conceptualized in FIG. 3, the database is structured to record a plurality of relationships 35 with data about the relationships such as the nature of the relationship, attributes 32 about the organizations 38, and identification data (such as a name). A code may be used in the database to indicate that an organization is visible 39 or anonymous 36, i.e. whether the organization is displayed to a user.

There may be only one relationship recorded for an organization but in most cases there will be many. The database preferably comprises millions of organizations and relationships.

The nature of the relationship may be displayed textually or graphically. The direction is indicated graphically in FIG. 3 using an arrow from the supplier of goods or services to the receiver.

As shown in this example, fifteen nodes 38 representing organizations are interconnected via fourteen relationships 35, indicating which organization in the relationship is a client, vendor, investor, partner, etc. In the case of 'Anon Client 1', the attribute data 'Seattle' and Bank may be displayed instead of the party name. As indicated, the 'Hewitt Corp' node is marked as visible in the relationship with 'XYZ' but anonymous in the relationship with 'SF Public Relations'. relationship record comprises relationship record comprises relationship record comprises relationship record comprises In contrast to other social networks storing mutual, non-directional connections (friend-friend, associate-associate, classmate-classmate), the present database and system are arranged to record the nature of relationships and their direction, for example, as indicated by the flow of goods and services from a first organization to a second organization. For example the direction may be unidirectional in the case of buyer-seller or bidirectional in the case of a partnership. This creates added complexity to the database but provides more information to viewers and creates additional search criteria.

By way of example, the nature of the relationship may be described in general terms: vendor-client, provider-receiver, buyer-seller; or in specific terms: partners, client-advisor, manufacturer-assembler, designer-distributor-retailer, joint venture, client-service provider, investor-investee, parent-subsidiary.

Alternative terms will occur to the skilled person as appropriate descriptions of a business relationship.

A relationship record may include relationship attribute data giving further details such as the good and services, time frames involved, investment amount, product type, sales amount, or terms of the contract. For example, "XYZ has sold reagents to NY Biotech Ltd since 2008, on a non-exclusive basis". This relationship attribute data provides the user with in-depth understanding of how each organization operates in the business community.

The system may be operated as a social network or online community wherein numerous users input numerous relationships between numerous companies. This allows users to share information with other users. Such sharing on social networks has been found to encourage the connectees to become users themselves and input their own relationships with existing users or potential users, such that the total number of records expands exponentially.

Database Format

Use herein below to business relationships, connections, organization data and connected organizations refer to information related to those items as stored in one or more databases, rather than the mere existence of a fact. The database may be implemented in a variety of ways known within computing science, such as an object database, relational database or graph database. Those skilled in the art of computer science will know how to implement such a database and will appreciate that there are other data structures that may be appropriate. Depending on the schema used, the data about an organization may be called an object, a record or a node. Generally these may all be called a 'data collection' to capture the concept of a group of data elements associated with an organization without reference to a specific data schema. For example, a vendor data object may comprise data elements for the vendor itself (e.g. name and location), or products and services that it supplies.

Figure 5:
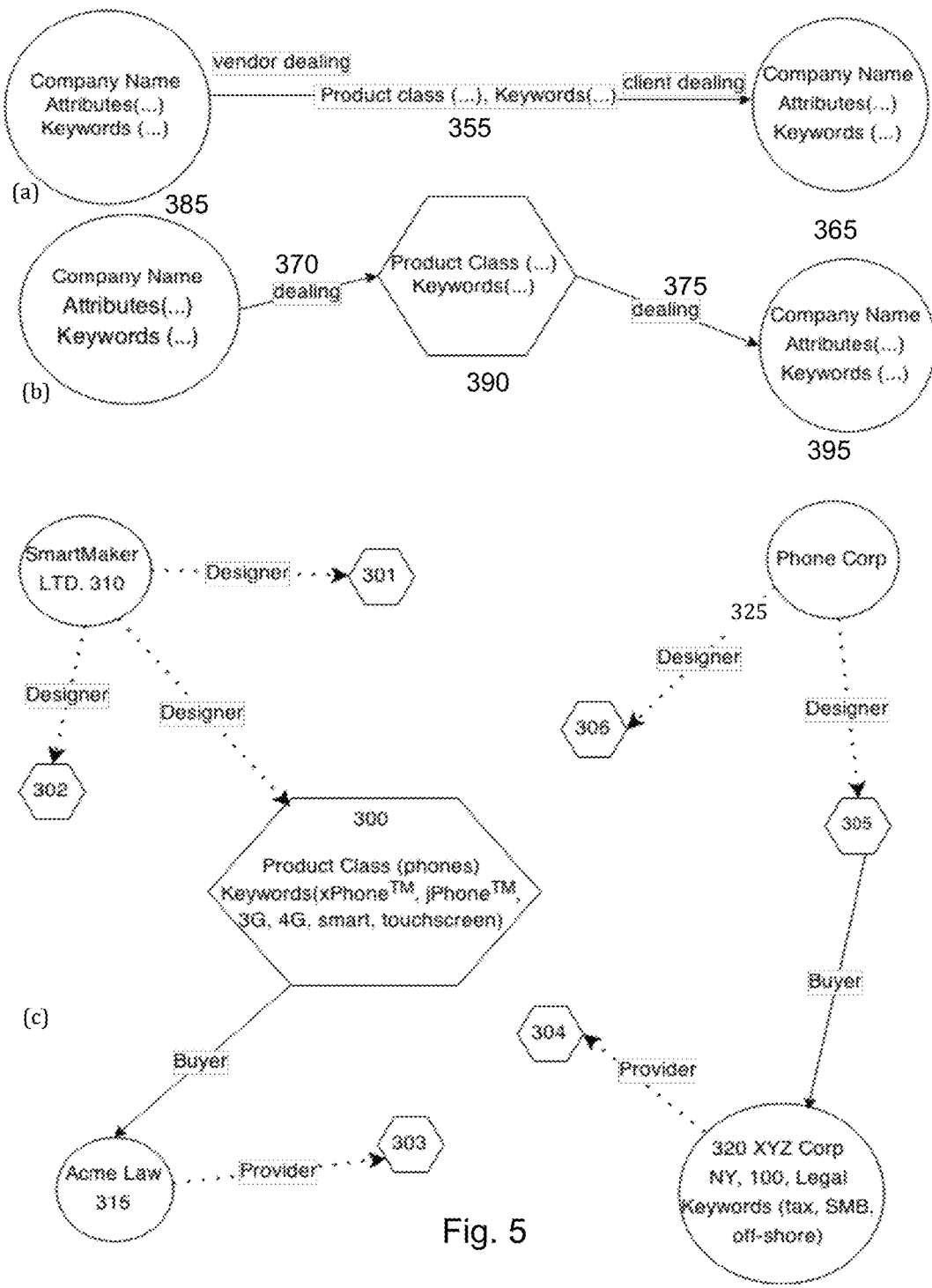
FIG. 5 is a graph of organizations with product nodes.

In preferred embodiments, a graph database is used, wherein organizations are stored as nodes and business relationships are stored as edges. This is illustrated in FIG. 3 by solid lines between organization circles with arrows to indicate the direction of the flow of goods or services from a vendor to a client. In FIG. 5, products and services are represented by hexagonal nodes connected by relationship edges to the vendor supplying and the client receiving the product/service.

A company can be viewed or defined as a supplier of specific products and services. This provides another level of abstraction for searching, classifying and discovering business networks. Conflating products and companies can cloud the true relationships that a company has with others. For example, a supplier might have many products associated with it and many clients directly connected to that company, leading to the uncertainty about which clients buy which products and whether certain products are actually bought by anyone at all. This makes it hard to determine whether a client of a supplier could recommend a particular product/service.

Thus the database may be arranged with organization data objects connected to product/service data objects. A supplier organization data object is connected to one or more of its own product/service data objects, each of which may be further connected to one or more client organization data object. This creates a new set of rules and opportunities for recommendations.

FIG. 3(a) illustrates an example database structure where a customer data object 365 is directly connected to supplier data object 385, and the data about the relationship (including the type of product or service) is recorded with the relationship data object 355. This is conceptually simpler than having a product data object 390 involved but requires replicating the product/service data for each relationship object.

In preferred embodiments, organizations are connected via relationship edges and product nodes. The relationship edges in FIG. 3 (b) are shown as a solid arrow from a product node (hexagon) to a consumer node (circle) and by a dashed arrow from a supplier node (circle) to a product node (hexagon). An organization may be a supplier and a consumer, depending on the product or service in which they are dealing.

The graph comprises a first type of edge (relationship edge) between products and organizations defining how an organization deals with respect to a product; e.g. as a maker, assembler, buyer, etc. Preferably a relationship data object comprises attributes about the relationship as well as flags including whether either organization is recorded as anonymous for that relationship or whether the relationship has been verified. Methods of verifying and handing anonymity are provided in US application U.S. 62/082,088, incorporated herein by reference. A relationship data object's attribute data may provide further details such as the time frames involved, investment amount, product type, sales amount, or terms of the contract, for example, "NY Biotech Ltd has purchased ABC Corp's reagents since 2008, on a non-exclusive basis" or "ABC Corp has sold reagents since 2004". This attribute data provides the user with in-depth understanding of trends and significance of relationships.

FIG. 5 (c) shows a simple database graph for two organizations 310, 325 (nodes) having products 305, 300 (nodes) connected by relationships (edges) to two client companies 315, 320. A user-search for a product will return all organizations that are connected (as suppliers) to product nodes that match the search criteria. The system also determines all companies that are connected to that product, as clients. The direction of the edge indicates whether the company sells or buys that product.

The user can now see who sells the products matching the search and who buys them. Additionally the engine can score suppliers or products organization based on their own attributes or attributes of the relationship to the client.

Data about a product or service supplied by an organization may be stored in a product/service table. A product record may include its product category, supply origin, brand name, model number and keywords. A company's service may be defined by its service category, office, specialism, and keywords.

Data Source

Data may be input by an organization to the relationship or by a third party using manual or automated means. In one embodiment, a person or web crawler scours the webpages of organizations and/or organization news providers to find relationships between organizations. At the same time, data about the organizations can be recorded.

The system stores data for organizations in the database, which can be used to find or compare organizations depending on the nature of the data. The data may be divided into different categories.

Identification data enables the system to identify the organization. Identification data includes data such as legal name, parent company name, CEO's name, office address, IP address, logos, brand names, or company registration number.

Profile data provides information about the organization's history, expertise, and accomplishments, possibly in an unstructured text format.

Attribute data describe properties of the organization using, but do not identify the organization. The attribute data may be sorted and classified according to a structure with defined terms. Attribute data includes classes and values such as industry, sector, general location, specialization, product class, service class, number of employees, funding stage, age, market capitalization, field of practice, or revenue.

Business segment data is a subset of attribute data for describing the function of an organization and includes classes such as industry, sector, specialization, product class, service class, or field of practice.

Classification

Classification of organizations, products and services may be implemented in the system at several levels from generic to specific. An organization/product/service data object could be described by an industry, specialism, product/service category, or even model number and brand name. The implementation will affect how a user can search for a product and how comparable one product is to another. For example, a search for a trade name will return very few suppliers. Conversely a search may be for a general category where the user is not sure what they need but wants to see what products are purchased by whom and supplied by whom.

In preferred embodiments, organization/product/service data objects comprise fields describing the product/service category. The product record may also have a plurality of keywords, such as unique selling points, differentiating qualities, brand names and models.

Organizations, products and services may be described according to an infinite number of properties and keywords. In order to compare or aggregate similar products and services it is useful to be able to categorize them. Machine learning, may be used to divide many individual products/services into groups and then assign any new product/service to one of the groups. In one embodiment, the method's categorization agent uses supervised learning, such as neural nets or classifier algorithms, to assign one or more categories to each product or service.

The database preferably comprises a data structure for a plurality of attribute types, each having a limited number of standard terms or values. For each standard term there is a vocabulary of synonyms. A classifier parses through an organization's profile data or scrapes the organization's webpage or other records for phrases and terms that are likely to be descriptive of the organization. These phrases and terms are compared to the vocabularies to determine the most suitable class and standard term. The standard terms are applied to the data object in the database for that organization as its attributes.

The structure may employ a taxonomy comprising super-categories, divided into many sub-categories. Each category may be associated or defined by a collection of words. A user may be prompted to select a particular standard category or enter a keyword, which the system maps to a standard category.

Potentially thousands of categories and several levels are used to capture tens of thousands of product/service commodities. For example, the system could implement the United Nations Standard Products and Services Code (UNSPSC) having a four-level hierarchy and eight-digit code to contain 50,000 commodities. Other standards such as NAICS, SIC-4, SIC-6, HS, European Union's Common Procurement Vocabulary, Germany's Eclass, and GS1's Global Product Classification.

Categorization is preferably done offline rather than in real-time. The category value (name or code) is stored with each data object (or relationship object in the case where the supplier and consumer are directly connected in the database) for future use.

Products/services may be searched at the most specific or most general category level or by varying the confidence requirement of the classifier Ranking Engine In the present system, server 12 receives a request to output organizations from client-computing device 10. A request to view data from the database may come from a search string or clicking on a hyperlink or a navigating a tree of services, products or industries. The request may come indirectly via a third party link, targeted ad or search engine result. The request may comprise criteria for selecting first organizations and one or more user-selections of attribute values for selecting second organizations. The criteria may be for selecting a product or service of a first organization. The user-selections of attribute value may select relationships between the first and second organizations.

The present ranking engine accepts such requests and returns a set of matching first organizations that have business relationships with second organizations that have attributes that satisfy the user's selections. Moreover the extant first organizations are ranked by algorithms whose parameters are based on the filter selections.

The ranking engine is a system comprising a database, processors, and software to communicate ranked organizations to a user. For simplicity, in the discussion hereafter, the organizations being sought shall be referred to as vendors (aka first organizations), and organizations receiving goods or services form the vendors shall be referred to as clients (aka second organizations). This supposes that a user wants to know from which vendors he should buy goods or services based on what clients use that vendor and are have attributes satisfying the user's selection. It will be appreciated that the search is not always directed at finding a vendor and that the organizations connected to a vendor are not always clients in the relationship. It will also be appreciated that the system may be used by an employee or a broker to search on behalf of an organization.

Figure 4:
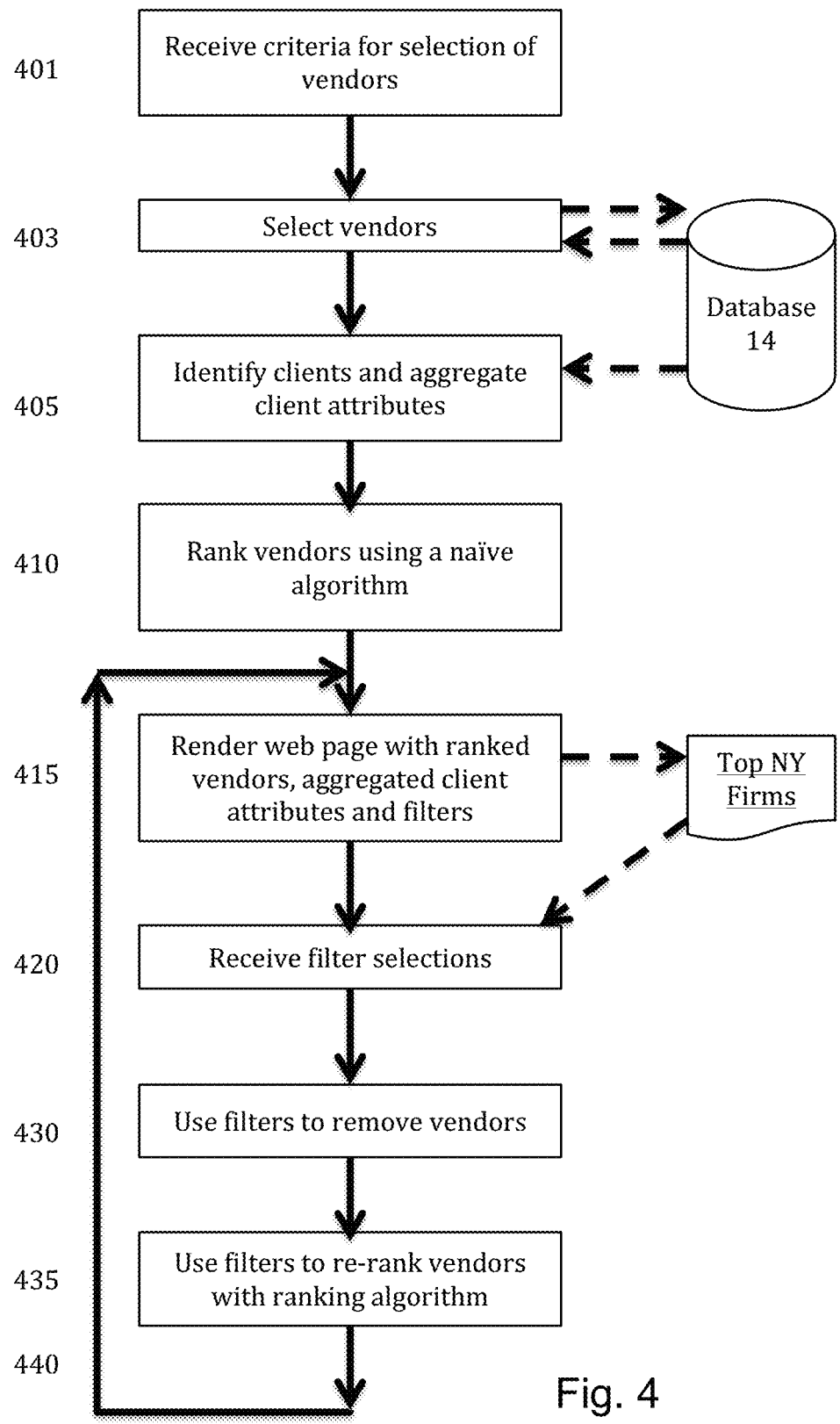
FIG. 4 is a flowchart for selecting and ranking organizations.

FIG. 4 is a flowchart for selecting and ranking organizations (first organizations), in this case vendors that have a business relationship to supply clients with some product or service.

In step 401, using keywords or selecting hyperlinks, the user indicates one or more criteria for the search of vendors (first organizations). Preferably the criteria are directed to business segment data. Examples of business segment values for a law firm include: law firm; lawyers; "specializing in contact negotiation"; and legal services. Whereas size, revenue, and location are examples of attribute data that would not indicate the business segment of an organization, they could be used as criteria to refine the search, possibly selected during a subsequent step.

In 403, a selection agent retrieves a set of data objects of first organizations from the database 14 that satisfy the criteria. The criteria are preferably one or more of: industry, specialism, product class or attribute class. The criteria may be expressed as by a keyword or code. Vendors may satisfy the criteria by virtue of the corresponding vendor data object comprising an attribute value matching a code, keyword or synonym thereof, or by virtue of connecting to a business relationship data object that indicates they supply a product class or service class matching a code, keyword or synonym thereof.

In 405, the selection agent identifies client (second organization) data objects that are connected by a relationship data object to the vendor (first organization) data object. To qualify as a second organization the relationship data object indicates that the relationship is relevant to the criteria. For example, in a search for a vendor of certain services, the relevant relationships will indicate the second organizations are clients of the services from the vendors. In a search for investors, the second organization will be investees receiving an investment from the investors.

The selection agent retrieves the attribute data of these second organizations (clients) and preferably aggregates the attributes of clients overall and per vendor.

In step 410, the set of vendors are ranked using a naïve algorithm. The naïve algorithm may depend on a) the quality of the match of the vendor to the search criteria, b) absolute values of the vendors attributes, weighted by the importance of the attribute types and/or c) the number of clients for each vendor. As an example naïve vendor scores may be used to order the set of vendors per Equation 1:

$$\text{Naive\_Score}_i = w_1 \times \text{Match}(\text{criteria}, \text{vendor}_i) + \Sigma_k{}^K w_{k+1} \times \text{att\_vend}_{i,k} \qquad \text{Eq. 1}$$

Where Ws are weights defined in a table, Match( ) is a keyword matching algorithm, $\text{att\_vend}_{i,k}$ are the K attributes of $\text{vendor}_i$. Equation 1 could also include consideration of the number of clients for a vendor. There may be several client and vendor attributes types used in the equation which are assumed, in this naïve ranking, to infer goodness of the vendor, prior to any personal considerations. Revenue, employees, office count, market capitalization are generally useful indicators of goodness, whereas location and industry are not quantifiable or directional and thus not helpful until a user-preference is established.

The matching function, Match( ), provides a quantitative measure that a vendor is relevant to or matches the search criteria. For example a shipping company is considered more relevant to the criteria of "shipping services" than a law firm that provides legal service to the shipping industry. The reverse conclusion would be reached if the criteria were, "services to the shipping industry". Therefore a search term may be contextualized and compared to a set of synonyms for the appropriate attribute stored with the vendor or relationship data object. In addition to the degree of relevancy, the matching function may consider the absolute amount or proportion of matching products/services that are supplied by a vendor. Thus vendors that are focused on or supply a large amount of a relevant service will score higher than vendors that are more diverse or supply a small amount.

The purpose of this initial ranking is to order the numerous vendors according to assumptions about what the user is looking for.

In step 415, a serialization agent serializes the vendor data into a format readable by the client-computing device. The serialized data may be output to the client-computer to format the content, for example using a smart phone app or a Java script. Alternatively a render agent may create readable content on the server and output an html web page, an image, or a PDF to the client device. This output comprises data about the set of ranked organizations, optionally including scores, vendor attributes, vendor identity and/or aggregated client attributes.

The output agent also provides a user interface (UI) to the user. The UI may be coded into the program or app on the client-computing device that receives the vendor data or the UI may be embedded in the output content itself and displayed by a browser. The UI comprises interactive selection elements, such as check-boxes, for selecting values or ranges of client attributes or relationship attributes.

The system receives user-selections, if any, in step 420. A user-selection or any subsequent changes to the user-selections, results in a filtering and re-ranking of vendors.

The selection agent then includes and/or excludes vendors depending on whether they supply clients via relationships that satisfy the user-selections. In one embodiment, the agent reduces the second organizations to a second set of second organizations (the filtered clients) that match the user-selections, and then reduces the first organizations to a second set of first organizations (the filtered vendors).

In step 435, the second set of first organizations is then re-ranked using the user-selections to refine the ranking algorithm. This re-ranking is explained in detail below.

In step 440, the method loops back to communicate data about the re-ranked second set of organizations (re-ranked and filtered vendors) to the client-computing device.

Figure 6:
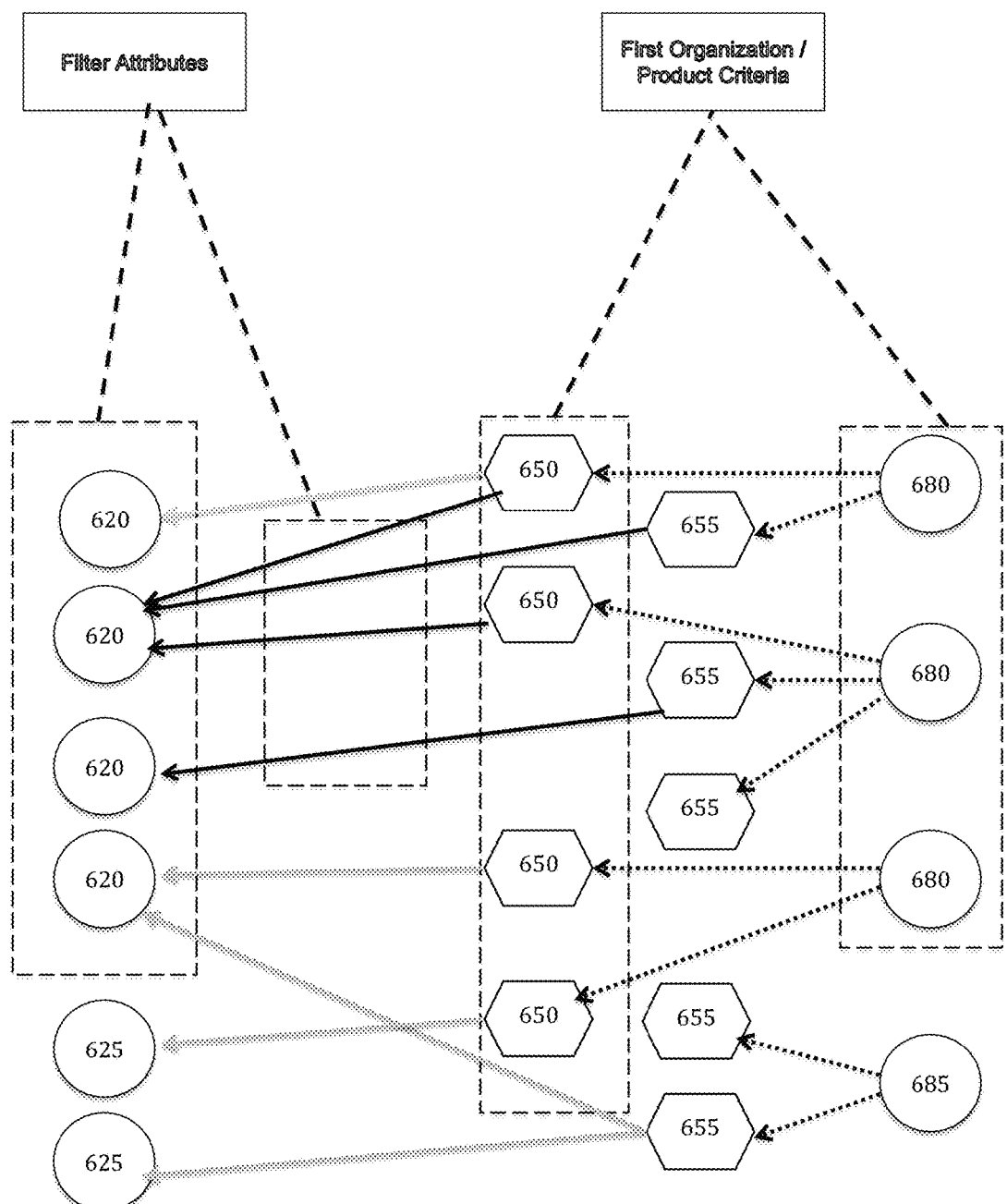
FIG. 6 is a search query on graph objects.

As illustrated by FIG. 6, the selection agent determines a) the second organizations 620 and relationships in the database that satisfy the user-selected filter attributes and b) products/services 650 or first organizations 680 that satisfy the criteria. Starting from products/services 650 or first organizations 680, the selection agent determines from the database connected business relationships and second organization 620.

After applying the filter, the selection agent may remove from consideration or calculation: non-satisfying second organizations 625; non-satisfying relationships; or products/services 655 or first organizations 685 that are relevant to the criteria but do not supply a satisfying client.

Figure 8:
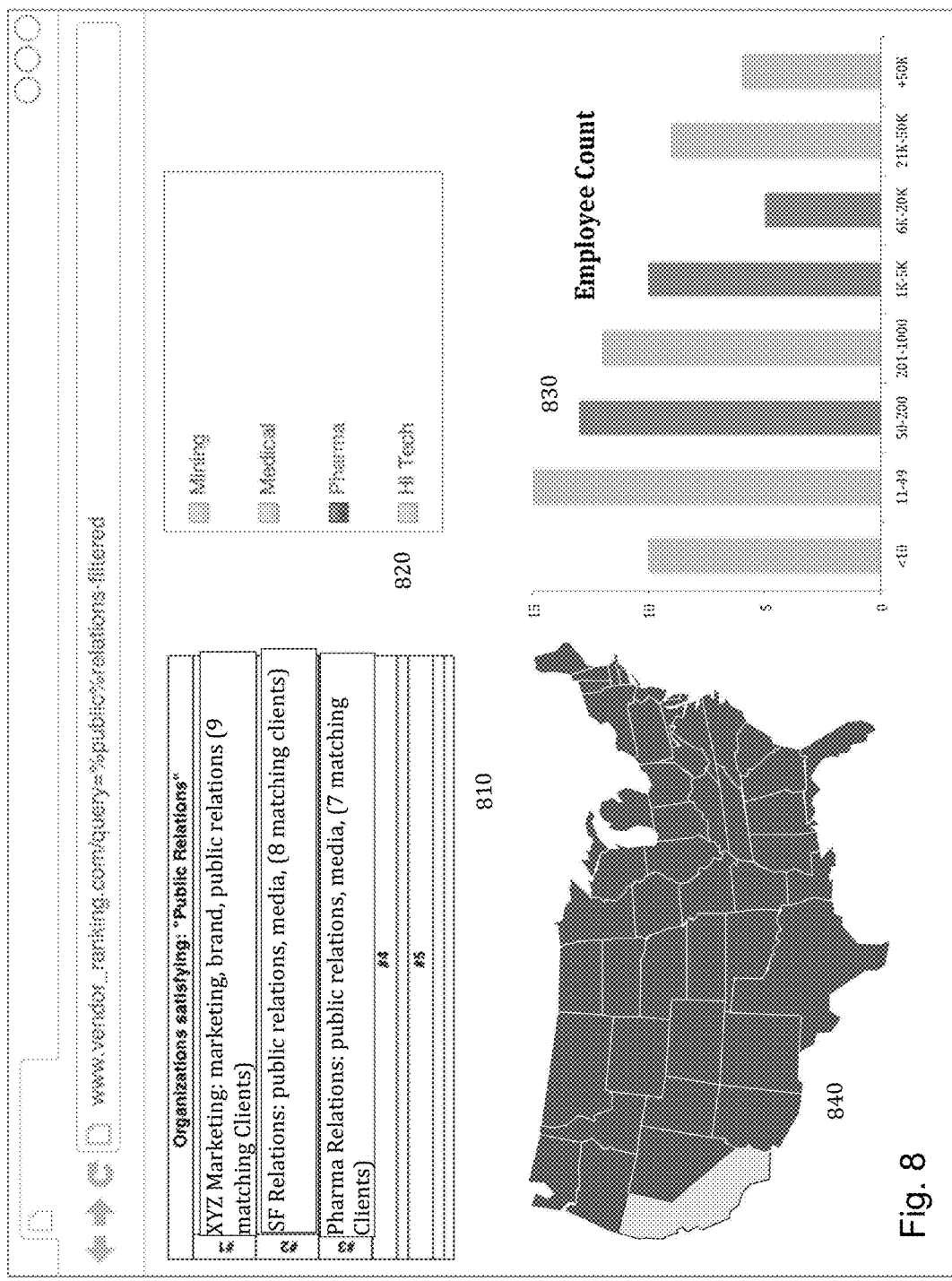
FIG. 8 is a webpage of ranked organizations.
Figure 9:
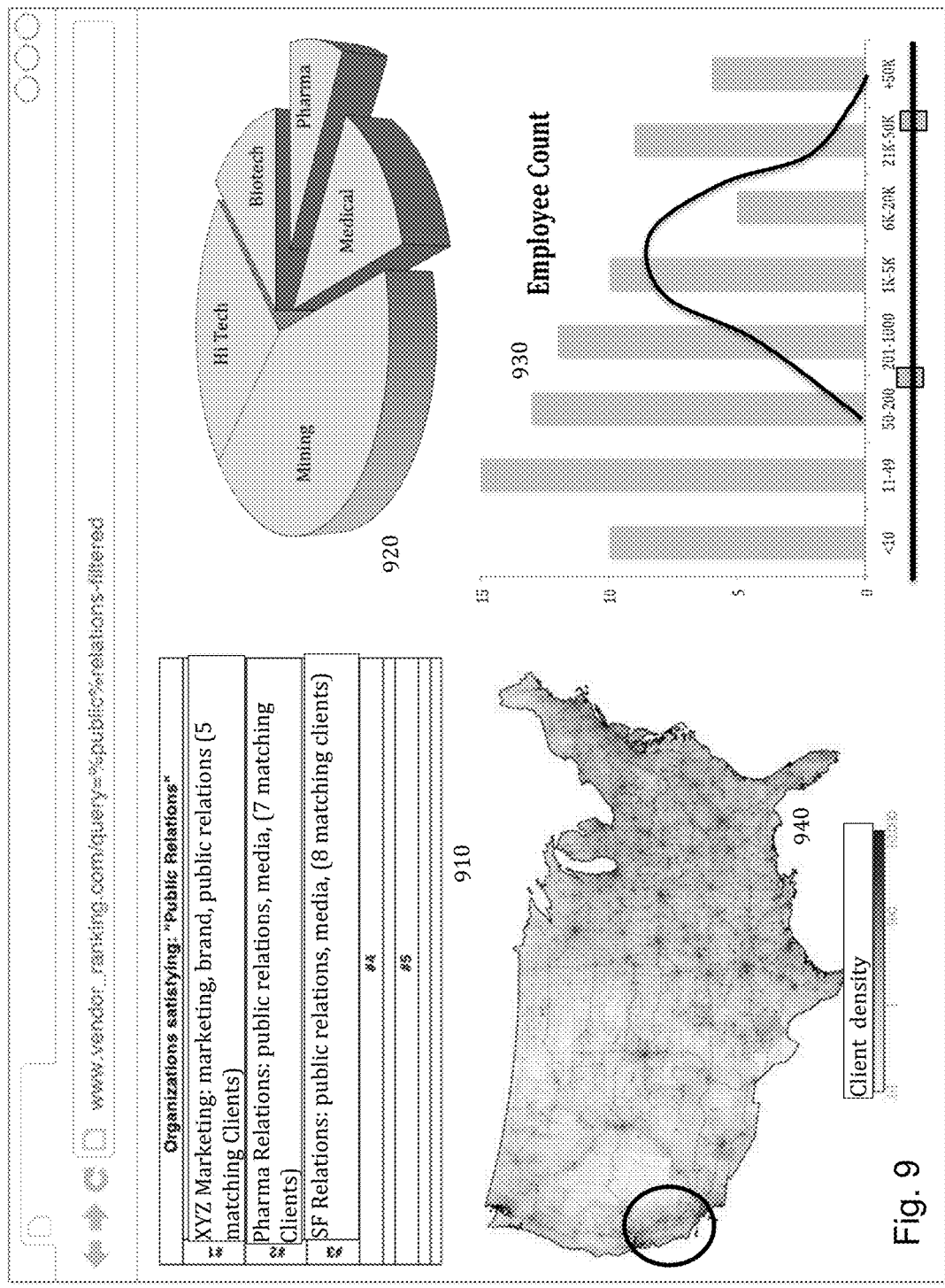
FIG. 9 is a webpage of ranked organizations.

As illustrated in FIGS. 8 and 9, a user may interface with interactive selection 820, 830, 840, 920, 930, 940 elements on a web page to select attribute filter values of the clients. Although not shown, the interactive elements may also allow the user to select attribute filter values of relationships. The interactive selection elements may be implemented in several ways, such as sliders, drop down menus, maps, check boxes, and radio buttons. More advanced user-interface techniques may be used or develop in future that have the similar effect of selecting client attribute values or ranges of values.

The interactive elements represent a plurality of attribute types (industry, employees, location, relationship duration, monetary value), each having a plurality of attribute filter values (pharma', '50-100 employees', 'California', 5 years, $5M, etc.) to select from. The user interacts with the interactive elements to select or deselect values or ranges of from one or more of the attribute types. The system may provide the interactive elements to the user with default values pre-selected. For example, the system may initially select for inclusion of: all of the attribute values present in the identified clients/relationships; only those values defining the user's organization; or values selected during a previous search query. The naïve ranking algorithm may be modified to include these default selections.

Some of the interactive elements may permit selecting continuous values, whilst others only permit discreet selection. Certain attribute types, such as industry or country, have inherently discreet values but the system may cluster or relate values to enable the user to select a range or to treat related values as if they too were selected. Similarly, certain attribute types, such as revenue and duration, are inherently continuous but may be placed into bins for discreet selection.

The system preferably determines the range of values for each attribute type within an unfiltered set of second organizations (all clients) and their unfiltered relationships and arranges the attribute filter values to span these ranges. For example, the system may have a table of 1000 industry values but only the industries describing the unfiltered clients will be displayed to the user. Thus the user does not need to consider the selection of attribute values that would not affect the vendor ranking. The attribute values from the filtered or unfiltered clients may be aggregated for each type and displayed to the user. For example, the UI may show heat maps or distributions of clients for each attribute type. The ranges for interactive elements may be determined from the total range of attribute values in the set of unfiltered clients divided by the number of divisions (e.g. check-boxes, histogram bins) in the element.

Selecting client or relationship attribute filter values causes the system to filter vendors and re-rank the extant vendors. There are many possible rules and variations thereon for filtering and algorithms for ranking, which will have these effects and are contemplated by the inventors. Exemplary rules and algorithms are discussed below and the skilled person will appreciate how they might be implemented and modified. The skilled person will appreciate that alternative algorithms and weightings may be used to calculate a score or rank for each vendor within the spirit of the invention and the invention is not intended to be limited to any particular rule or algorithm.

The second set of second organizations (i.e. included or filtered clients) may be determined from the union or the intersection of the client/relationship attributes selected. That is, a client is included if it satisfies a selected value for any attribute type, alternatively, a client is included only if it satisfies selected values for all of the attribute types. The latter rule is the more usual filtering technique, e.g. only include clients that are Biotech AND mid-sized AND Russian. The former rule enables the user to be very specific in selecting important attributes without overly reducing the client count. For example, a user might be influenced by biotech companies but would equally be influenced by mid-sized clients in any industry. Likewise attribute filters for relationships and clients may be combined. For example, a user may be interested in vendors that supply a particular industry or have supplied anyone for a duration of at least 5 years. Selected values within an attribute type are always treated as a union filter, i.e. a client may satisfy any of those values to be included.

This second set of second organizations is used to determine the second set of first organizations, i.e. only vendors supplying clients that satisfy the user-selections are further considered for re-ranking and display to the user.

The re-ranking algorithm uses the attribute selection to create a new vendor score or ranking, optionally including the scores from the naïve algorithm (e.g. Eq. 1). The naïve scoring contribution serves to reflect the overall goodness of a vendor that may only have a few filtered clients. The rescoring of vendor$_i$ may be simply expressed by Eq. 2:

$$\text{rescore}_i = W_c \times \Sigma_j \text{Relevance}(\text{client}_{i,j}) + \text{naive\_score}_i \qquad \text{Eq. 2}$$

Where Wc is a weight, the Relevance( ) function measures the relevance or match of the client$_{i,j}$ to the user-selected attributes, preferably applied as an intersection filter. In its simplest form, Relevance( ) returns 1 for each client that matches all the filter selection and 0 (or a small number) otherwise. Alternatively Relevance( ) may return a sum of weighted client attribute values (of attribute types not used in the filter) for clients that satisfy the filters, and 0 otherwise. The selected attributes may be applied as a union filter and the vendors re-scored by Eq. 3:

$$\text{rescore}_i = W_{rev} \times \text{num}_{rev} + W_{emp} \times \text{num}_{emp} + W_{loc} \times \text{num}_{loc} + \ldots + \text{naive\_score}_i \qquad \text{Eq. 3}$$

Where $W_{xxx}$ are weights of attribute types and $\text{num}_{xxx}$ are the number of clients that satisfy the user-selections for attributes xxx, such as revenue, employee count, and location, etc. This equation enables each attribute type to be weighted differently and clients that satisfy user-selected values of more than one attribute type to be counted multiple times.

As discussed above, relationship data objects may have anonymity and/or verification attributes. Values for these attribute types may also be selected by the user, such that the vendors are filtered and/or ranked by this. Thus in some embodiments, the system allows the user to select a relationship status value of relationship between selected vendors and clients, and the ranking algorithm will rank vendors based on the number of or degree to which their relationships with clients matches the user-selected relationship status value. Thus the re-ranking algorithms, such as Equations 2 to 6, may be modified to include relationship attributes.

Using the relationship status to rank vendors may encourage organizations to verify and make visible more relationships, assuming that users prefer to filter by the values, "visible" and "verified". The ranking algorithm may take the form of Equation 2, measuring the relevance of a client that has a business relationship with the vendor, which relationship has attributes that match the user-selected status values.

A modification of Equation 3 is to replace the number of matching clients with the sum of client magnitudes for the user-selected attribute values. The client attribute values may comprise a magnitude or degree to which they are described by that value, rather than being described by a value in a binary sense. Thus a client may be 40% mining and 60% oil, such that its attributes contribute only 0.4 towards the vendor score, if the user selects only mining as a filter. These magnitudes are summed for all clients supplied by a vendor and multiplied by the attribute type weight.

The attribute weights may be predefined and stored in the system's memory. Alternatively the attribute weights may be dynamically altered to reflect the selectiveness of the user. Thus the fewer values or narrower range that a user selects within a particular attribute type, the greater the weight of that attribute type. The attribute weight could be calculated as an initial weight, Wxxx, multiplied by the full attribute range of the unfiltered clients divided by the user-selected attribute range (or multiplied by the total number of unfiltered clients divided by the number of clients after applying the filter).

$$W'_{xxx} = W_{xxx} \times \frac{\text{full\_range}}{\text{selected\_range}} \qquad \text{Eq. 4}$$

The rank agent may implement a rule to increase the attribute weighting for any attribute type where the user adjusts the values from the default values. This captures the inference that the user cares enough about the attribute to change it.

In a preferable embodiment, the rank agent calculates vendor scores using utility functions on attribute values of connected second organizations. The utility function provides an output that varies with the client's attribute value, being maximum for a value within the user-selected range and a minimum outside this range. To contrast with the consistent weights in equation 3, the utility function is dependent on the value and is not a constant.

The utility function may be linear or non-linear. Preferably the function is maximum for values in the middle of a two-sided range, maximum for value towards the unspecified extreme of a one-sided range, or maximum for values at the center of a radial function. Preferably the function decays to substantially zero near the range limits. The vendor score may be expressed as:

$$\text{rescore}_i = \Sigma_j^J F_{rev}(\text{Rev}_j,\max,\min) + \Sigma_j^J F_{loc}(\text{Loc}_j,\text{center},\text{radius}) \quad \text{Eq 5}$$

where $F_{re}$, is a revenue utility function for scoring a client's revenue $\text{Rev}_j$ over the two-sided range specified by max and min; $F_{loc_j}$ is a radial function for scoring the client's location $\text{Loc}_j$ from a center location up to a limit specified by radius. The score for each vendor is summed over their J clients. As before, the rescore may also include the naïve score.

The utility function used may be chosen by the skilled person to reflect the anticipated importance and directionality of any client attribute, where the general assumption is that clients with values closer to the user-selected values contribute the most score. As an example, the function F may be an inverse function, sigmoid function or a bell-curve such as:

$$F_{rev} = \frac{W_{rev}}{\sigma\sqrt{2\pi}} e^{-\frac{(REV_i - \mu)^2}{2\sigma^2}}, \mu = \frac{\max + \min}{2}, \quad \text{Eq. 6}$$

$$\sigma = \frac{(\max - \min)}{6}$$

The utility function approach enables the user to give the most weight to clients nearest an optimum, and still giving some weight to those further away. Thus the user does not need to worry whether or not to include clients on the edge of a selection box and uses the actual attribute value of the client rather than treating all values within a bin as equal.

In FIG. 9, different interactive elements 920, 930, 940 are provided to the user. A pie-chart allows the user to select one or more client industries with a weighting dependent on the degree of selection. In this case, a main industry ("Pharma") is selected and two related industries are auto-selected. The rank agent may apply a higher weight to the main industry and progressively smaller weights to progressively less-related industries. For the location selection, the rank agent applies an inverse function to the distance of a client from the center, whereby clients near the limits of the selected area will contribute little to zero to a vendor score. Lastly, a slider allows the user to select a range for the clients' employee count. A bell-curve utility function is applied where the limits of the sliders represent the ±3σ points.

In one embodiment, the utility function approach also permits the system to omit the step of explicitly including or excluding clients according to the user-selection. This is done by arranging functions such that the outputs for attribute values outside the selected ranges are low compared to values inside the range, preferably at least an order of magnitude lower, more preferably decaying to zero. In this case, all clients are included but only those with values nearest the selected values will make a significant contribution to the rank of a vendor.

The rank agent uses the scoring in an ordinal sense to arrange vendors for display, i.e. by arranging the vendors from highest to lowest scoring. This could be done without calculating a numerical score as above, simply by comparing the vendors to see which had the most filtered clients.

Displaying Data

Figure 7:
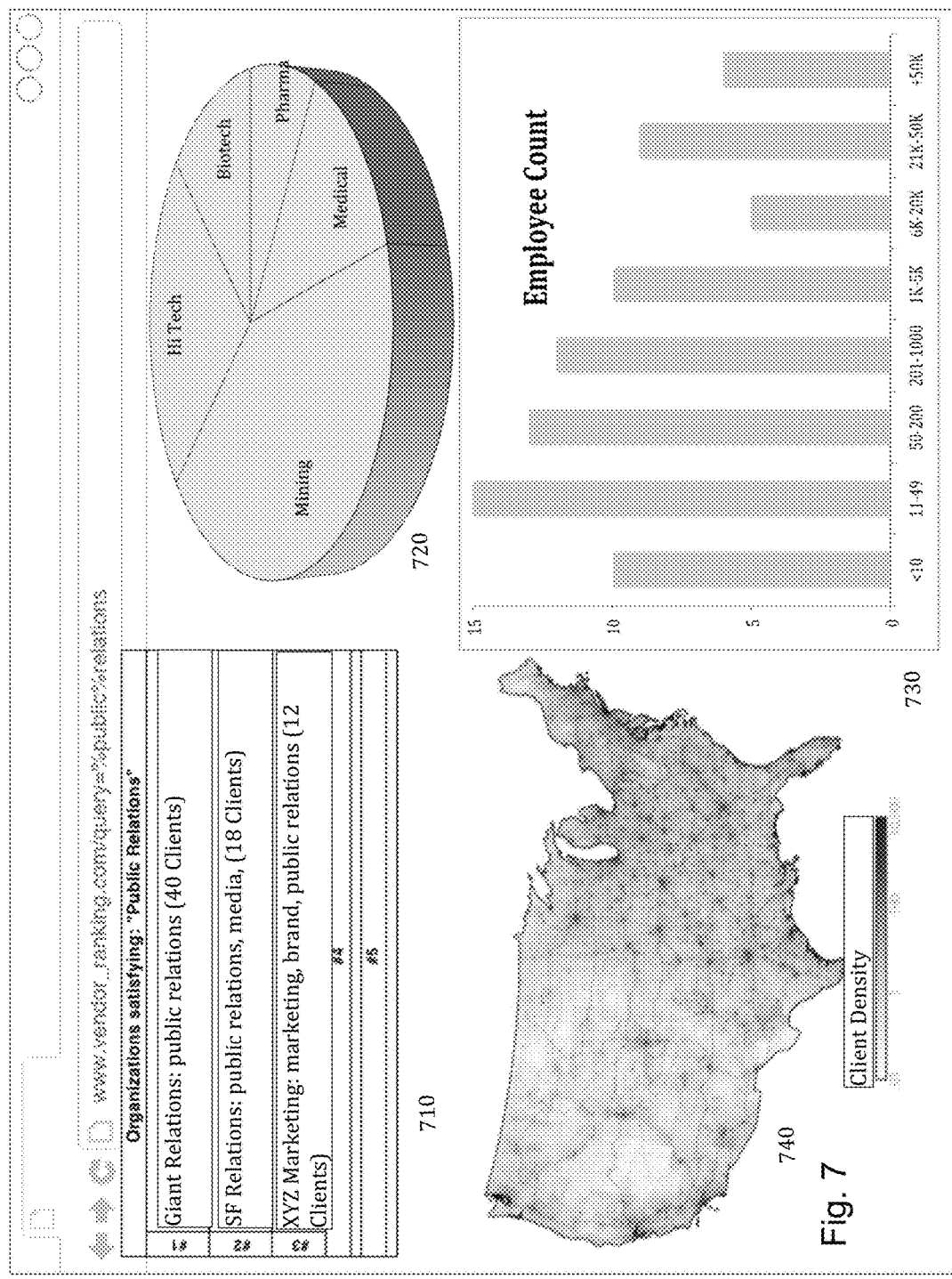
FIG. 7 is a webpage showing ranked vendors and client attributes.

In an example illustrated in FIG. 7, a webpage is displayed in response to a request to display organizations that have "public relations" recorded as their service or industry. The results box 710 shows the matching vendors ranked using the naïve-ranking algorithm. Their clients' attributes are aggregated and displayed for client industry, client employee count, and client location. These aggregated attributes are provided as interactive elements 720, 730, 740, such that the user can click on the elements to select values or ranges. Only attribute values present in the client attributes are shown as attribute filter values for selection.

In some cases not all of the first organization in the first or second set will be displayed. For example, the method may select the top three highest ranked vendors for immediate display, whereby further vendors may be requested by the user. The subset of first organizations to display is selected according to the rank but the number may depend on the user's screen size, bandwidth, or request.

FIG. 8 shows a webpage where the user has selected one client industry, one client location and three ranges for employee count. The vendors are filtered down to those that supply clients that satisfy the selected attributes and are re-ranked in results box 810. The previously top ranked vendor was removed for having no satisfying clients and the remaining vendors were ranked according to their number of satisfying clients.

FIG. 9 shows an alternative interface for selecting client attributes and the resulting changes to the vendors displayed. "Pharma" was selected for the client industry, with the related industries "Medical" and "Biotech" auto-selected and receiving a lesser weight. A range for employees is selected with a utility function overlaid. A location center and radius is drawn by the user. The vendors are re-ranked using three utility functions such that vendors with the most relevant clients, rather than most clients, are highest ranked.

The above description provides example methods and structures to achieve the invention and is not intended to limit the claims below. In most cases, the various elements and embodiments may be combined or altered with equivalents to provide a recommendation method and system within the scope of the invention. It is contemplated that any part of any aspect or embodiment discussed in this specification can be implemented or combined with any part of any other aspect or embodiment discussed in this specification. Unless specified otherwise, the use of "OR" between alternatives is to be understood in the inclusive sense, whereby either alternative and both alternatives are contemplated or claimed.

For the sake of convenience, the example embodiments above are described as various interconnected functional agents. This is not necessary, however, and there may be cases where these functional agents are equivalently aggregated into a single logic device, program or operation with unclear boundaries. In any event, the functional agents can be implemented by themselves, or in combination with other pieces of hardware or software.

Certain terms are used herein interchangeably. For example, aspects that are intended to be hidden from output may be called 'anonymous', 'unidentified', 'private' obfuscated' or 'hidden' whereas those intended for output may be called 'public', 'identified', or 'visible'.

While particular embodiments have been described in the foregoing, it is to be understood that other embodiments are possible and are intended to be included herein. It will be clear to any person skilled in the art that modification of and adjustment to the foregoing embodiments, not shown, are possible.

What is claimed is:

1. A computer-implemented method of communication data about organizations to a user from a graph database storing business relationships between organizations, the method comprising:
    a processor receiving at a server, a query from a client device to output a set of first organizations,
        wherein the query comprises criteria for selecting first organizations and one or more user-selected attributes for selecting second organizations;
    a processor selecting a set of first organizations that satisfy the criteria and traversing the graph to select a set of second organizations that are connected in the graph to any selected first organization and that have attributes that match the one or more user-selected attributes;
    a processor ranking the first organizations, wherein a rank of each first organization depends on a relevance of (a) attributes of second organizations having a business relation with that first organization to (b) the user-selected attributes; and
    a processor communicating to the user, a subset of the first organizations, according to the ranking.

2. The method of claim 1, wherein only first organizations that have a business relationship with second organizations are communicated to the user.

3. The method of claim 1, wherein the first organizations are suppliers of a product or service relevant to the criteria and the second organizations are consumers of those products or services.

4. The method of claim 1, wherein the rank of each first organization is at least partly based on a relevance score of attribute values of that first organization to the criteria.

5. The method of claim 1, wherein the criteria for selecting first organizations is directed to a business function, product or service.

6. The method of claim 1, wherein each second organization has attribute values that match the user-selected attributes for all of a plurality of attribute types.

7. The method of claim 1, wherein each second organization has attribute values that match any of the user-selected attributes.

8. The method of claim 1, wherein the criteria comprises keyword(s) entered by the user, which keyword(s) specify an industry, specialization, service or product of first organizations to be selected.

9. The method of claim 1, wherein the rank of each first organization is at least partly based on a relevance of (i) products or services supplied by that first organization to one or more second organizations to (ii) the criteria.

10. The method of claim 1, wherein the user-selected attributes are determined from attribute filter values selected or deselected by the user from a plurality of attribute types, preferably wherein the one or more user-selected attributes are directed to one or more of: location, industry, size, or revenue.

11. The method of claim 1, wherein the one or more user-selected attributes are directed to relationship attributes of the business relationship between the first and second organizations, the relationship attributes preferably being one or more of: a rating, a duration, or a monetary spending.

12. The method of claim 1, further comprising a processor altering a ranking function for first organizations if the one or more user-selected attributes differ from default attribute selections.

13. The method of claim 1, wherein ranking comprises a utility function applied to attributes of the second organizations, whereby the utility function's output is maximum within a range determined by the user-selected attributes and decays to a minimum outside of the range.

14. A computer-implemented method of communication data about vendors to a user from a graph database storing business relationships between organizations, the method comprising:
    a processor receiving at a server, a query from a client device to output data corresponding to a set of vendors, wherein the query comprises criteria for selecting vendor data objects,
        and one or more user-selected attribute values for selecting client data objects;
    a processor selecting vendor data objects comprising data that satisfy the criteria;
    a processor traversing the graph to select client data objects that are connected in the graph to any selected vendor data object and comprise attribute values satisfying the one or more user-selected attributes;
    a processor ranking the vendor data objects, wherein a rank for each vendor data object depends on the relevance of (a) attributes of client data objects connected by a business relation data object to that vendor data object to (b) the user-selected attribute values; and
    a processor communicating content to a user relating to the highest ranked vendors data objects.

15. The method of claim 14, wherein at least one of the user-selected attribute values are relationship attributes of relationship data objects and selecting client data objects further comprises selecting client data objects that are connected to any selected vendor data object by a relationship data object satisfying the user-selected relationship attribute, preferably wherein the relationship attribute is an anonymity status or verification status.

16. The method of claim 14, further comprising
    a processor providing a user-interface comprising a plurality of interactive elements for the user to select attribute values of the client data objects.

17. The method of claim 14, further comprising a processor aggregating attributes of the identified client data objects to determine a range of attribute values selectable by the user.

18. The method of claim 14, further comprising a processor determining an initial ranking of identified vendor data objects and outputting the initial ranking to the user, wherein the initial ranking depends on the attributes of the identified vendor data objects.

19. The method of claim 16, wherein the interactive elements relate to a plurality of attribute types, each having a plurality of attribute values from which the user may select.

* * * * *